(12) United States Patent
Starossek (10) Patent No.: US 11,549,568 B2
(45) Date of Patent: Jan. 10, 2023

(54) DEVICE FOR DAMPING VIBRATIONS IN A STRUCTURE

(71) Applicant: SOLETANCHE FREYSSINET, Rueil Malmaison (FR)

(72) Inventor: Uwe Starossek, Hamburg (DE)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 261 days.

(21) Appl. No.: 16/760,874

(22) PCT Filed: Oct. 30, 2018

(86) PCT No.: PCT/EP2018/079753
§ 371 (c)(1),
(2) Date: Apr. 30, 2020

(87) PCT Pub. No.: WO2019/086482
PCT Pub. Date: May 9, 2019

(65) Prior Publication Data
US 2021/0172490 A1 Jun. 10, 2021

(30) Foreign Application Priority Data
Nov. 2, 2017 (EP) ..................................... 17306515

(51) Int. Cl.
*F16F 15/22* (2006.01)
*F03D 13/20* (2016.01)
*F03D 80/80* (2016.01)
*F16F 7/10* (2006.01)

(52) U.S. Cl.
CPC ............ *F16F 15/223* (2013.01); *F03D 13/20* (2016.05); *F03D 80/88* (2016.05); *F16F 7/1005* (2013.01); *F05B 2240/912* (2013.01); *F05B 2260/964* (2013.01); *F16F 2222/08* (2013.01); *F16F 2228/001* (2013.01); *F16F 2230/0011* (2013.01); *F16F 2230/18* (2013.01); *F16F 2232/02* (2013.01)

(58) Field of Classification Search
None
See application file for complete search history.

(56) References Cited

U.S. PATENT DOCUMENTS

| 2,248,182 A | 7/1941 | Mateer |
| 3,306,399 A | 2/1967 | Flannelly |
| 2010/0243392 A1* | 9/2010 | Sloth ....................... F03D 13/20 318/696 |

(Continued)

FOREIGN PATENT DOCUMENTS

| DE | 10 2006 059189 A1 | 6/2008 |
| DE | 10 2008 055872 A1 | 5/2010 |
| DE | 10 2011 109070 A1 | 1/2013 |

(Continued)

*Primary Examiner* — Juan G Flores
(74) *Attorney, Agent, or Firm* — Dentons US LLP (57) ABSTRACT

A device for damping vibrations in a structure including a first (or inner) element rotatably mounted around a rotational axis and a second (or outer) element rotatably mounted around said rotational axis. A radius (R1) of a circle portion delimitating the first element with respect to the rotational axis, being smaller than a radius (r2) of a circle portion delimitating the second element with respect to the rotational axis.

12 Claims, 4 Drawing Sheets

(56) References Cited

U.S. PATENT DOCUMENTS

2012/0107116 A1  5/2012  Obrecht

FOREIGN PATENT DOCUMENTS

| DE | 20 2007 019622 U1 | 6/2014 |
| EP | 0 047 433 A2 | 3/1982 |
| EP | 0047433 A2 * | 3/1982 |
| EP | 2 899 397 A1 | 7/2015 |
| WO | 2008/133614 A1 | 11/2008 |

* cited by examiner

DEVICE FOR DAMPING VIBRATIONS IN A STRUCTURE

This application is a National Stage Application of International Application No. PCT/EP2018/079753, filed on Oct. 30, 2018, which claims the benefit of and priority to European Patent Application No. 17306515.2, filed on Nov. 2, 2017, all of which are hereby incorporated by reference in their entirety for all purposes as if fully set forth herein.

The present invention relates to a device for damping vibrations in a structure.

Usually, structures like construction structures are submitted to vibrations that can affect their usability, durability or stability.

In particular, a wind turbine tower is a structure that has to undergo many vibrations because of the wind blowing on its long tower but also because of the movement of the blades as well as the parasite vibrations created by a generator and other mechanical and electrical components linked to the conversion of the wind energy into electricity.

It is known from EP 2 100 054 to dampen these undesirable vibrations thanks to a device comprising a first element rotatably mounted and driven around a rotational axis and a second element rotatably mounted and driven around another rotational axis.

However, even though the vibrations are greatly reduced by this device, other vibrations are generated due to undesirable moments introduced by the device. As also known from EP 2 100 054, these undesirable moments and parasite vibrations can be avoided by splitting one of the two rotatably mounted elements in two parts and arranging the two parts at both sides, along the rotational axis, of the other rotatably mounted element. However, this improved arrangement makes the device much more cumbersome and bulky and the mechanical design more complicated.

The present invention aims at solving the above mentioned issues.

To this end, the invention relates to a device for damping vibrations in a structure, comprising a first element rotatably mounted around a rotational axis and a second element rotatably mounted around said rotational axis, a radius of a circle portion delimiting the first element with respect to the rotational axis, being smaller than a radius of a circle portion delimiting the second element with respect to the rotational axis, the first element being called inner element, and the second element being called outer element.

Thanks to the claimed device, the respective center of mass of the inner and the outer elements are disposed in the same plane, said plane being orthogonal to rotation axis, which eliminates parasite flexion moments and drastically reduces the volume that is occupied by the device.

According to another aspect of the invention, the inner element and the outer element rotate with opposed directions around the rotational axis.

According to another aspect of the invention, the inner element and the outer element are configured such that at least a plane perpendicular to the rotational axis intercepts both the center of mass of the inner element and the center of mass of the outer element.

According to another aspect of the invention, the first and second elements are disposed such that a product of the first distance multiplied by a mass of the first element is the same as a product of the second distance multiplied by a mass of the second element.

According to another aspect of the invention, the first and second elements are disposed such that rotational inertia of the first element approximately coincides with rotational inertia of the second element.

According to another aspect of the invention, the first element has a general shape such that a cross section of a given thickness, called first thickness, is delimited by an angular sector, called first angular sector, and a given height, called first height.

According to another aspect of the invention, the second element has a general shape such that a cross section of a given thickness, called second thickness, is delimited by an angular sector, called second angular sector, and a given height, called second height.

According to another aspect of the invention, the device is configured such that the first element and the second element rotate independently from each other around the rotational axis.

According to another aspect of the invention, the device comprises a controller to control the rotations of the first element and the second element, preferably through one or more driving mechanisms.

According to another aspect of the invention, the controller is configured to determine the rotational speed and the phases of the rotations of the inner element and the outer element.

The invention also relates to a structure configured to undergo vibrations and equipped with at least one device as previously described.

According to another aspect of the invention, the structure is a wind turbine tower.

According to another aspect of the invention, the structure comprises two devices as previously described, each of the devices being disposed inside the tower.

The invention also relates to a use of the device as already described, wherein the controller determines the rotational speed and the phases of the rotations of the inner element and the outer element on the basis of real-time continuous measurements of the vibrations in the structure to produce control forces that dampen the vibrations of the structure.

Other aspects and advantages of the invention will become apparent from the following detailed description of the specific embodiments of the invention, and the accompanying drawings, in which.

DEVICE FOR DAMPING VIBRATIONS IN A STRUCTURE

As can be seen from FIGS. 1 to 4, a device 1 for damping vibrations in a structure comprises a first element 2 and a second element 4, both elements being rotatably mounted around a rotational axis 3 and being driven independently from each other around said rotational axis 3.

A distance, called first distance, noted d1, between the first element 2 and the rotational axis 3 is smaller than a distance, called second distance, and noted d2, between the second element 4 and the rotational axis 3.

The distance d1 can be defined as the distance between the rotational axis 3 and the center of mass of the inner element 2, as detailed below.

The distance d2 can be defined as the distance between the rotational axis 3 and the center of mass of the outer element 4, as detailed below.

In the following description, the first element 2 is called inner element 2, and the second element 4 is called outer element 4.

Figure 1:
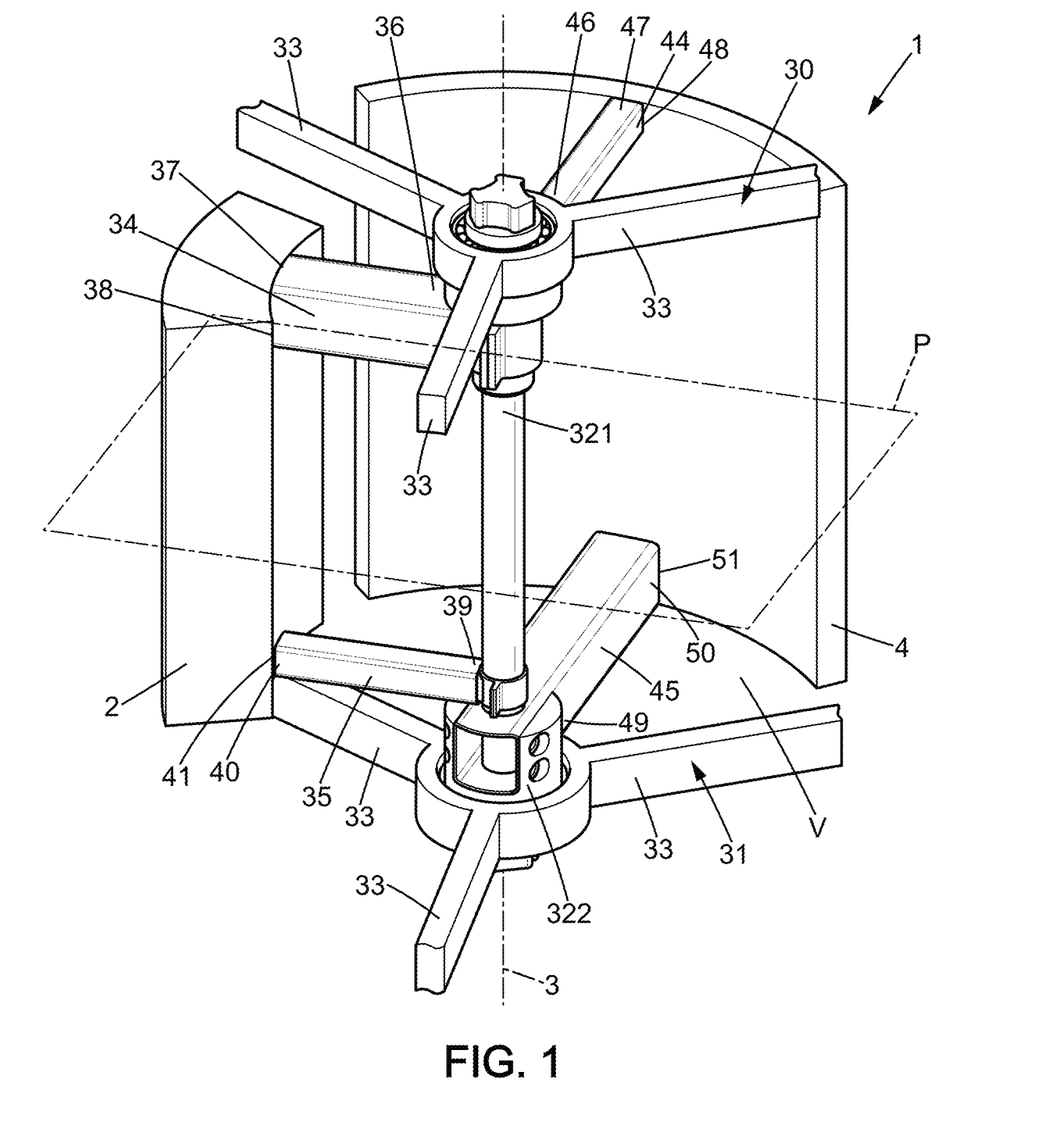
FIG. 1 illustrates a perspective view of a device for damping vibrations in a structure according to the present invention.

As can be seen from FIG. 1, the inner element 2 and the outer element 4 are configured such that at least a plane P that is perpendicular to the rotational axis 3 intercepts both the inner element 2 and the outer element 4.

This configuration ensures that the inner element 2 is disposed inside a virtual cylindrical volume 19 defined by the rotational movement of the outer element 4, thus reducing the volume occupied by the device 1.

Advantageously, a product p1 of the first distance d1 multiplied by a mass m1 of the inner element 2 is the same as or approximately coincides with (as will be detailed below) a product p2 of the second distance d2 multiplied by a mass m2 of the outer element 4:

$$p1 = m1d1 \approx m2d2 = p2 \quad (1).$$

The mass-distance product p1, p2 of each element 2, 4, determines the achievable control force amplitude, and thus the damping effect of the associated elements 2 and 4.

In the preferred mode of operation, the angular velocities of the two masses are equal and their rotational directions are opposed.

The mass-distance product p1 of the inner element 2 being equal to the mass-distance product p2 of the outer element 4 makes a balance in the dynamic forces, and therefore a directed harmonic control force achievable, such that the vibrations in a structure equipped with the device 1 can efficiently be reduced. The latter is achieved by using an appropriate control algorithm ensuring the operation of the device 1 in the preferred mode of operation.

Advantageously, a rotational inertia J1 of the inner element 2 approximately coincides with a rotational inertia J2 of the outer element 4 (as will be detailed below):

$$J1 \approx J2 \quad (2).$$

The rotational inertia J1, J2 of each element 2, 4, determines the torque magnitude induced by angular acceleration given to each mass m1, m2, and thus the total torque (moment) induced by rotations of elements 2 and 4, which is minimized (balanced) when the angular accelerations of the two masses are equal and the acceleration directions are opposed.

Figure 2:
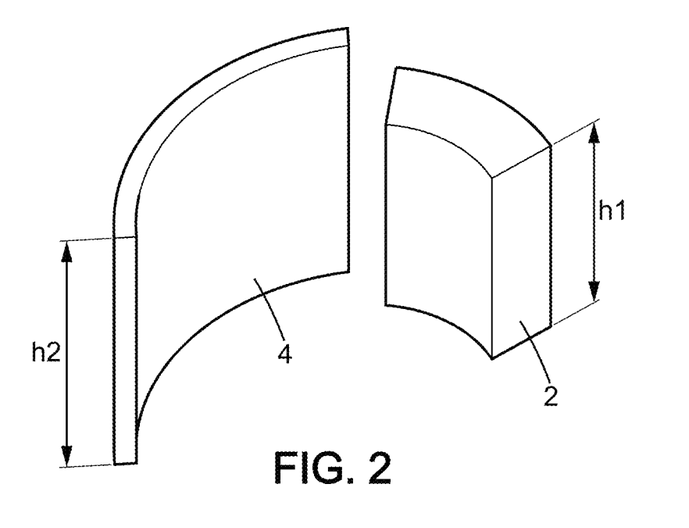
FIG. 2 illustrates a detailed view of two elements of the device of FIG. 1.
Figure 3:
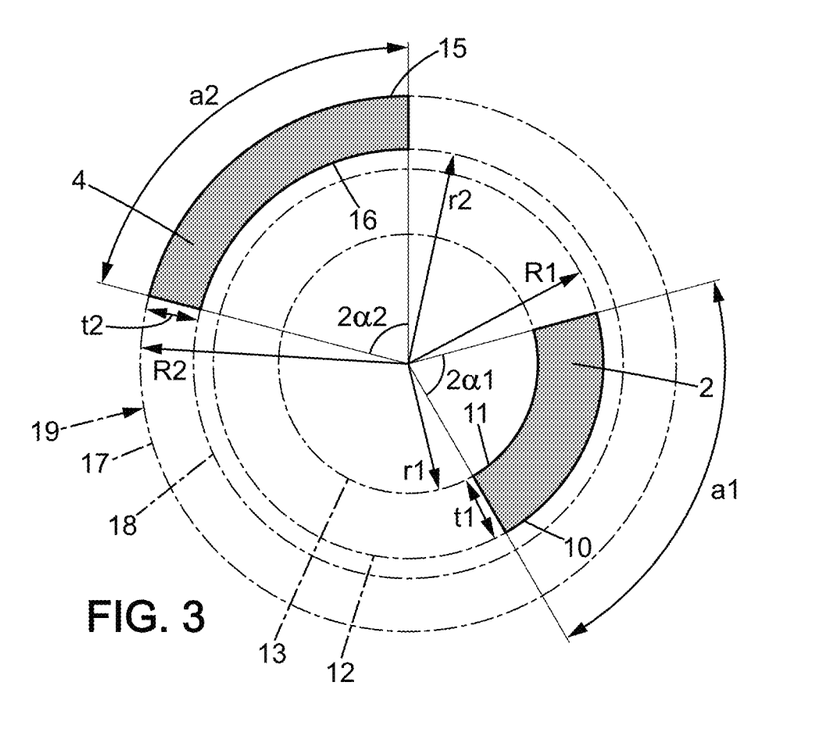
FIG. 3 illustrates a schematic view in a transverse plane of the device of FIG. 1.

As can be particularly seen from FIGS. 1, 2 and 3, the inner element 2 has a general shape delimited by a cross section of a given thickness, called first thickness, and noted t1, comprised in an angular sector, called first angular sector a1, and a given height, called first height, h1.

In other words, the section of the inner element 2 is delimited by two portions 10, 11 of two concentric circles, a first circle 12 and a second circle 13.

The first circle 12 has a radius noted R1 that is greater than a radius r1 of the second circle 13.

The difference between R1 and r1 gives the value of the thickness t1.

The portion 10 is the part of the first circle 12 that is included into the first angular sector a1.

The portion 11 is the part of the second circle 13 that is included into the first angular sector a1.

Similarly, the outer element 4 has a general shape delimited by a section of a given thickness, called second thickness, t2 comprised in an angular sector, called second angular sector, a2, and a given height, called second height, h2.

The section of the outer element 4 is delimited by two portions 15, 16 of two concentric circles, a first circle 17 and a second circle 18.

The first circle 17 has a radius noted R2 that is greater than a radius r2 of the second circle 18.

The difference between R2 and r2 gives the value of the thickness t2.

The portion 15 is the part of the first circle 17 that is included into the second angular sector a2.

The portion 16 is the part of the second circle 18 that is included into the second angular sector a2.

As can be seen from FIG. 3, the circles 12, 13, 17, 18 are concentric.

As can be seen from FIG. 3, the radius R1 of the circle portion 10 delimiting the inner element 2 with respect to the rotational axis is smaller than the radius r2 of the circle portion 16 delimiting the outer element 4 with respect to the rotational axis.

Figure 4:
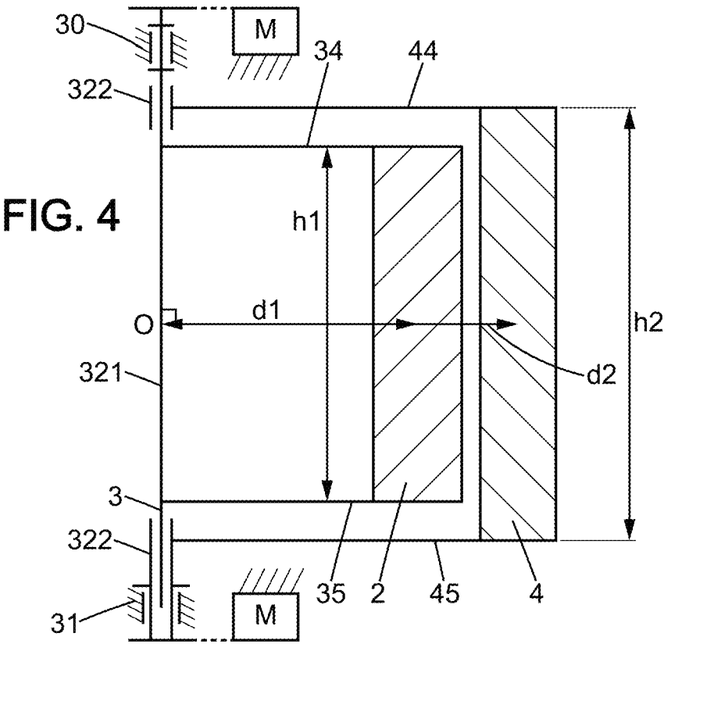
FIG. 4 illustrates a schematic view in a longitudinal plane of the device of FIG. 1.

As can be seen from FIG. 4, the inner element 2 and the outer element 4 are disposed such that the direction of the height h1 and the direction of the height h2 extend parallel to the rotational axis 3.

As can be seen from FIG. 4, the height h1 is preferably smaller than the height h2 so that the inner element 2 can rotate around axis 3 inside the volume delimited by the outer element 4 and beams 44, 45:

$$0.9 \leq \frac{h2}{h1} \leq 1.3, \quad (3)$$

and advantageously $$1.0 \leq \frac{h2}{h1} \leq 1.1. \quad (4)$$

The inner element 2 and the outer element 4 are mounted to be symmetric relative to a plane perpendicular to the rotational axis 3 and passing through a center point O.

Advantageously, the plane P passes through the center point O.

As can be seen from FIG. 3, a sectional area of the inner element 2, noted A1, is defined as follows:

$$A1 = \alpha 1 (R_1^2 - r_1^2) \quad (5),$$

And a sectional area of the outer element 4, noted A2, is defined as follows:

$$A2 = \alpha 2 (R_2^2 - r_2^2) \quad (6).$$

The mass m1 of the inner element 2 can be expressed as:

$$m1 = A1 h1 \rho \quad (7),$$

wherein ρ is a density of the material of the inner element 2.

The mass m2 of the outer element 4 can be expressed as:

$$m2 = A2 h2 \rho \quad (8),$$

wherein ρ is a density of the material of the outer element 4.

Assuming a constant material density, the distance d1 between the rotational axis 3 and the center of mass of the inner element 2 is:

$$d1 = \frac{2}{3} \frac{(R_1^3 - r_1^3)\sin\alpha 1}{\alpha 1 (R_1^2 - r_1^2)}. \tag{9}$$

Likewise, the distance d2 between the rotational axis 3 and the center of mass of the outer element 4 is:

$$d2 = \frac{2}{3} \frac{(R_2^3 - r_2^3)\sin\alpha 2}{\alpha 2 (R_2^2 - r_2^2)}. \tag{10}$$

Assuming a constant material density, the rotational inertia J1 associated to inner element 2, mass m1, rotating around the rotational axis 3 is:

$$J1 = \frac{m1}{2}(R_1^2 + r_1^2). \tag{11}$$

Likewise, the rotational inertia J2 associated to the outer element 4, mass m2, rotating around the rotational axis 3:

$$J2 = \frac{m2}{2}(R_2^2 + r_2^2). \tag{12}$$

The device 1 is configured such that the damping performance for a given total mass is maximized. This is achieved by maximizing the total mass-distance product to total mass ratio (RMR):

$$RMR = \frac{m1 d1 + m2 d2}{m1 + m2} = \frac{p1 + p2}{m1 + m2} = \max, \tag{13}$$

two other constraints being taken into account.

The first constraint is that the product p1 approximately coincides with p2, which ensures that a directed harmonic control force is generated in the preferred mode of operation of the device 1, that is, when mass m1 and mass m2 rotate with the same rotational velocity but in opposite directions.

The ratio p2/p1 is preferably within a specific deviation range:

$$0.90 \leq \frac{p2}{p1} \leq 1.10. \tag{14}$$

The second constraint is that the rotational inertia of the inner element 2, J1, approximately coincides with the rotational inertia of the outer element 4, J2, which ensures that moments induced during acceleration processes are minimized.

The ratio J2/J1 is preferably within a specific deviation range:

$$0.75 \leq \frac{J2}{J1} \leq 1.25. \tag{15}$$

Equation 13 with the two above-mentioned constraints may lead to conditions on the angular sectors α2/α1, thicknesses t2/t1 and heights h2/h1 ratios.

As can be seen from FIG. 1, the device 1 also comprises an upper frame 30 and a lower frame 31.

The upper frame 30 and the lower frame 31 are connected one to another through a continuous shaft 321 and an interrupted hollow shaft 322. Furthermore, they are rigidly connected to a structure whose vibrations are to be damped.

The axis of shaft 321 and the axis of the hollow shaft 322 coincide with the rotational axis 3. The hollow shaft 322 consists of an upper part, which only serves as a support for the second element 4, and a lower part, which additionally transfers the required moment to drive the second element 4. Shaft 321 passes through, and is laterally guided by, the two parts of the hollow shaft 322.

In a preferred embodiment, each frame 30, 31 comprises a unit of three rods 33 that extend radially, two adjacent rods forming an angle of 120°, and are rigidly connected to a structure whose vibrations are to be damped (not illustrated).

The device 1 also comprises a first upper beam 34 and a first lower beam 35 that extend radially.

The first upper beam 34 and the first lower beam 35 connect the inner element 2 to the shaft 321.

An extremity 36 of the first upper beam 34 is fixed to the shaft 321 while another extremity 37 of the first upper beam 34 is fixed to an upper portion 38 of the inner element 2.

Similarly, an extremity 39 of the first lower beam 35 is fixed to the shaft 321 while another extremity 40 of the first lower beam 35 is fixed to a lower portion 41 of the inner element 2.

Preferably, the length of the first upper beam 34 is equal to the length of the first lower beam 35.

Preferably, the first upper beam 34 is thicker than the second lower beam 35.

The idea is to transmit the moment for driving the first element 2 mainly by the first upper beam 34 to minimize the torsional deformations of shaft 321.

The device 1 also comprises a second upper beam 44 and a second lower beam 45 that extend radially.

The second upper beam 44 connects the outer element 4 to the upper part of the hollow shaft 322. The second lower beam 45 connects the outer element 4 to the lower part of the hollow shaft 322.

An extremity 46 of the second upper beam 44 is fixed to the hollow shaft 322 while another extremity 47 of the second upper beam 44 is fixed to an upper portion 48 of the outer element 4.

Similarly, an extremity 49 of the second lower beam 45 is fixed to the hollow shaft 322 while another extremity 50 of the second lower beam 45 is fixed to a lower portion 51 of the outer element 4.

Preferably, the length of the second upper beam 44 is equal to the length of the second lower beam 45.

Preferably, the second upper beam 44 is thinner than the second lower beam 45.

The first upper beam 34 being thicker than the first lower beam 35 and the second upper beam 44 being thinner than the second lower beam 45 allows driving the first element 2 with the first upper beam 34 and the second element 4 with the second lower beam 45, thereby minimizing the rotational deformations in the shafts 321, 322 and the bending deformations in the beams.

The beams 34, 35, 44 and 45 have advantageously hollow square or circular profiles.

As can be seen from FIG. 4, the shaft 321 is restrained at top and bottom and relative to the hollow shaft 322 to the effect that shaft 321, and the upper and lower beams and the inner element connected to it, can rotate around axis 3 but have no further degrees of freedom. Likewise, the two parts of the hollow shaft 322 are restrained at top and bottom and relative to the shaft 321 to the effect that the hollow shaft 322, and the upper and lower beams and the outer element connected to it, can independently rotate around axis 3, that is, independently of shaft 321, but have no further degrees of freedom. Hence the first element 2 and the second element 4 can rotate, independently from each other, around axis 3.

As can also be seen in FIG. 4, the shaft 321 and the hollow shaft 322 are independently driven by one or more driving mechanisms M. The driving mechanism M is controlled by a controller (not illustrated). Hence the rotations of the first element 2 and the second element 4 are controlled by a controller. Advantageously, the one or more driving mechanisms comprise one or more motors and/or one or more transmissions. Advantageously, the one or more transmissions comprise one or more belt transmissions.

On the basis of real-time continuous measurements of the vibrations in the structure, carried out with sensors, like accelerometers, and using an appropriate control algorithm, the controller determines the rotational speed and the phases of the rotation of the inner element 2 and the outer element 4, as, in principle, known from EP 2 100 054.

Real-time continuous measurements and an appropriate algorithm are also used for computing the direction of the predominant vibrations perpendicular to the axis 3.

In a preferred mode of operation, a harmonic control force in a direction perpendicular to the axis 3 results, this direction being aligned with the direction of the predominant vibrations perpendicular to the axis 3, so that the damping effect is maximum. In contrast to EP 2 100 054, the control force can be directed in any direction perpendicular to the axis 3 without producing undesirable moments and parasite vibrations.

Wind Turbine Tower

Figure 5:
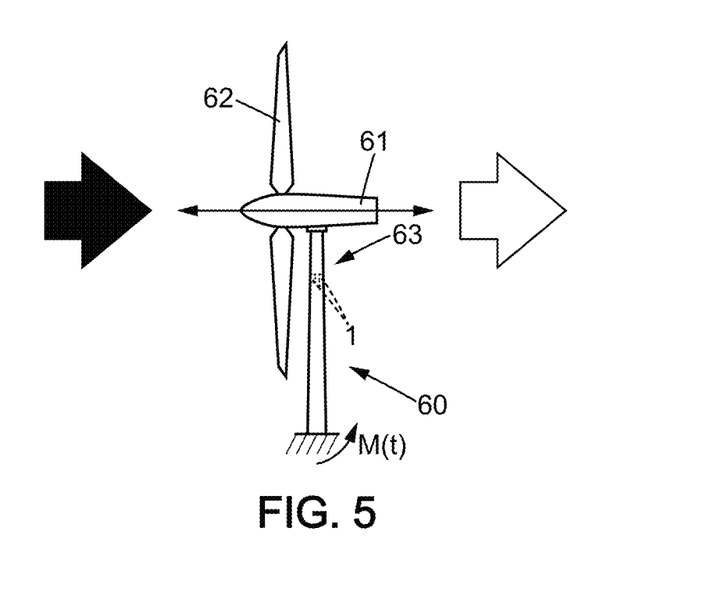
FIG. 5 illustrates a wind turbine tower equipped with two devices of FIG. 1.

A wind turbine tower 60 is configured to receive a nacelle 61 on which are mounted rotor blades 62.

The wind turbine tower 60 comprises at least one device 1.

The one or more devices 1 are preferably disposed at locations within the tower 60 where large lateral vibrations occur. For damping the first mode of vibration, one or more devices 1 are preferably disposed in the upper part 63 of the tower 60. For damping the second or higher modes of vibration, one or more devices 1 are preferably disposed in intermediate locations within the tower 60.

Figure 6:
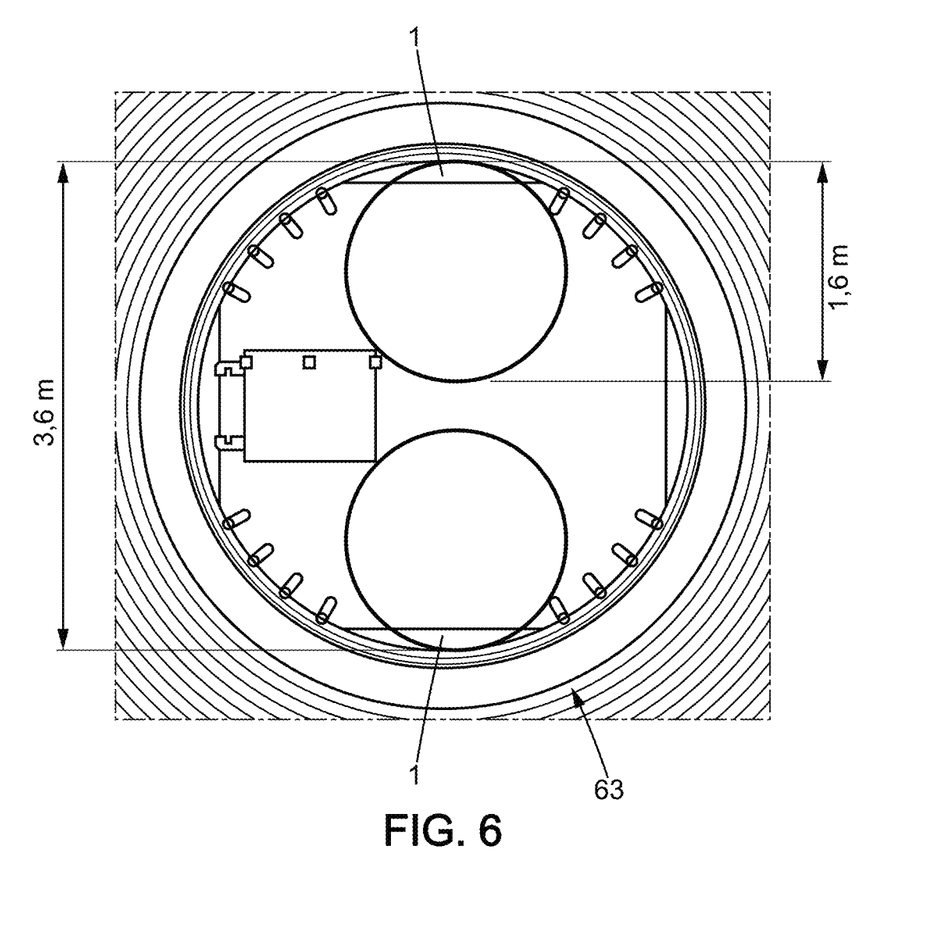
FIG. 6 illustrates a cross sectional view of an inside of the tower of FIG. 5.

As shown in FIG. 6, the wind turbine tower 60 preferably comprises at least two devices 1 at the same or different locations within the tower 60.

The two devices 1 are advantageously identical one to another.

The devices 1 are installed in the tower 60 such that a direction of their rotation axes 3 extends parallel to a longitudinal axis L of the tower 60.

Advantages

The device according to the present invention efficiently dampens vibrations of a structure. Compared to EP 2 100 054, it avoids parasite vibrations and, at the same time, drastically reduces the volume that is occupied by the device and enables a simpler mechanical design.

The invention claimed is:

1. A device for damping vibrations in a structure, comprising:
   a first element rotatably mounted around a rotational axis; and
   a second element rotatably mounted around said rotational axis,
   wherein a radius of a circle portion delimitating the first element with respect to the rotational axis being smaller than a radius of a circle portion delimitating the second element with respect to the rotational axis, the first element being called inner element, and the second element being called outer element,
   wherein the inner element and the outer element rotate with opposed directions around the rotational axis, and
   wherein the inner element and the outer element are configured such that at least a plane perpendicular to the rotational axis intercepts both the center of mass of the inner element and the center of mass of the outer element.

2. The device for damping vibrations in a structure according to claim 1, wherein the inner and outer elements are disposed such that a product of a first distance multiplied by a mass of the inner element approximately coincides with a product of a second distance multiplied by a mass of the outer element, the first distance being a distance between the center of mass of the inner element and the rotational axis and the second distance being a distance between the center of mass of the outer element and the rotational axis.

3. The device for damping vibrations in a structure according to claim 1, wherein the inner and outer elements are disposed such that rotational inertia of the inner element approximately coincides with rotational inertia of the outer element.

4. The device for damping vibrations in a structure according to claim 1, wherein the inner element has a general shape such that a cross section of a given thickness, called first thickness, is delimited by an angular sector, called first angular sector, and a given height, called first height.

5. The device for damping vibrations in a structure according to claim 1, wherein the outer element has a general shape such that a cross section of a given thickness, called second thickness, is delimited by an angular sector, called second angular sector, and a given height, called second height.

6. The device for damping vibrations in a structure according to claim 1, wherein the device is configured such that the inner element and the outer element rotate independently from each other around the rotational axis.

7. The device for damping vibrations in a structure according to claim 1, comprising:
   a controller to control the rotations of the inner element and the outer element through one or more driving mechanisms.

8. The device for damping vibrations in a structure according to claim 7, wherein the controller is configured to determine the rotational speeds and the phases of the rotations of the inner element and the outer element.

9. A structure configured to undergo vibrations and equipped with at least one device according to claim 1.

10. The structure according to claim 9, wherein the structure is a wind turbine tower.

11. The structure according to claim 10, wherein the at least one device comprises two devices according to claim 1, each of the devices being disposed inside the wind turbine tower.

12. Use of the structure according to claim 9, wherein a controller determines the rotational speed and the phases of the rotation of the inner element and the outer element on the basis of real-time continuous measurements of the vibrations in the structure to produce control forces that dampen the vibrations of the structure.

\* \* \* \* \*